United States Patent
Kolb

(10) Patent No.: US 8,116,969 B2
(45) Date of Patent: Feb. 14, 2012

(54) METHOD FOR EQUALIZING TRAFFIC FLOWS AND FOR AVOIDING AND RESOLVING CONGESTION

(75) Inventor: Dieter Kolb, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 1064 days.

(21) Appl. No.: 11/988,919

(22) PCT Filed: Jul. 7, 2006

(86) PCT No.: PCT/EP2006/064008
§ 371 (c)(1),
(2), (4) Date: Jan. 17, 2008

(87) PCT Pub. No.: WO2007/009892
PCT Pub. Date: Jan. 25, 2007

(65) Prior Publication Data
US 2009/0037086 A1 Feb. 5, 2009

(30) Foreign Application Priority Data
Jul. 18, 2005 (DE) .................. 10 2005 033 460

(51) Int. Cl.
*G08G 1/0968* (2006.01)

(52) U.S. Cl. ........ 701/118; 701/117; 701/119; 701/209; 701/210; 340/905; 340/906

(58) Field of Classification Search .................. 701/117, 701/118, 119, 209, 210; 340/905, 906
See application file for complete search history.

(56) References Cited

U.S. PATENT DOCUMENTS

| | | | | | |
|---|---|---|---|---|---|
| 5,703,778 | A | * | 12/1997 | Takahashi et al. | 701/118 |
| 6,320,515 | B1 | * | 11/2001 | Olsson | 340/905 |
| 6,480,783 | B1 | * | 11/2002 | Myr | 701/117 |

(Continued)

FOREIGN PATENT DOCUMENTS

DE 199 07 041 8/2000

(Continued)

OTHER PUBLICATIONS

M. Friedrich, I. Hofsab, K. Nokel, P. Vortisch, "A Dynamic Traffic Assignment Method for Planning and Telematic Applications," in Proc. of Seminar K, European Transport Conference, 2000, pp. 29-40.*

(Continued)

*Primary Examiner* — Thomas Black
*Assistant Examiner* — Peter D Nolan
(74) *Attorney, Agent, or Firm* — Harness, Dickey & Pierce, P.L.C.

(57) ABSTRACT

A method is disclosed in which traffic flows are equalized. In at least one embodiment, this is achieved by virtue of road users receiving individual route recommendations from a traffic control computer in such a manner that the traffic control computer uses reports from road users and route segment parameters to determine, for each route branch point, a new respective distribution ration for the statistical frequency of the respective route recommendations at a respective route branch point at particular intervals of time, a route being allocated a higher frequency in the case of more favourable traffic conditions, and in such a manner that a respective road user receives, before a respective route branch point, a random route recommendation from the set of alternatively possible routes in accordance with the statistical frequency of the respective route recommendations.

16 Claims, 1 Drawing Sheet

U.S. PATENT DOCUMENTS

| | | | |
|---|---|---|---|
| 6,574,547 B2 * | 6/2003 | MacPhail et al. | 701/117 |
| 6,580,997 B2 * | 6/2003 | MacPhail et al. | 701/117 |
| 6,597,982 B1 * | 7/2003 | Schmidt | 701/117 |
| 6,611,750 B2 * | 8/2003 | MacPhail et al. | 701/117 |
| 6,633,238 B2 * | 10/2003 | Lemelson et al. | 340/909 |
| 6,885,935 B2 * | 4/2005 | MacPhail et al. | 701/117 |
| 7,002,486 B2 * | 2/2006 | Lawrence | 340/905 |
| 7,027,915 B2 * | 4/2006 | Craine | 701/117 |
| 7,236,881 B2 * | 6/2007 | Liu et al. | 701/209 |
| 7,363,144 B2 * | 4/2008 | Liu et al. | 701/117 |
| 7,386,391 B2 * | 6/2008 | Morariu et al. | 701/117 |
| 7,526,377 B2 * | 4/2009 | Wiener et al. | 701/200 |
| 7,725,250 B2 * | 5/2010 | Bisdikian et al. | 701/117 |
| 2003/0069683 A1 | 4/2003 | Lapidot et al. | |
| 2005/0093720 A1 * | 5/2005 | Yamane et al. | 340/995.13 |
| 2005/0273250 A1 * | 12/2005 | Hamilton et al. | 701/200 |
| 2007/0083322 A1 * | 4/2007 | Van Ee | 701/117 |

FOREIGN PATENT DOCUMENTS

| | | |
|---|---|---|
| DE | 102 03 242 | 7/2003 |
| DE | 102 24 467 | 12/2003 |
| DE | 103 15 788 | 11/2004 |

OTHER PUBLICATIONS

Informatikseminar—Apr. 8, 2004, FH Wedel, DE, Professor Dr. Uwe Schmidt and Dr. Sebastian Iwanowski zum Thema "Verteilte Systeme".

* cited by examiner

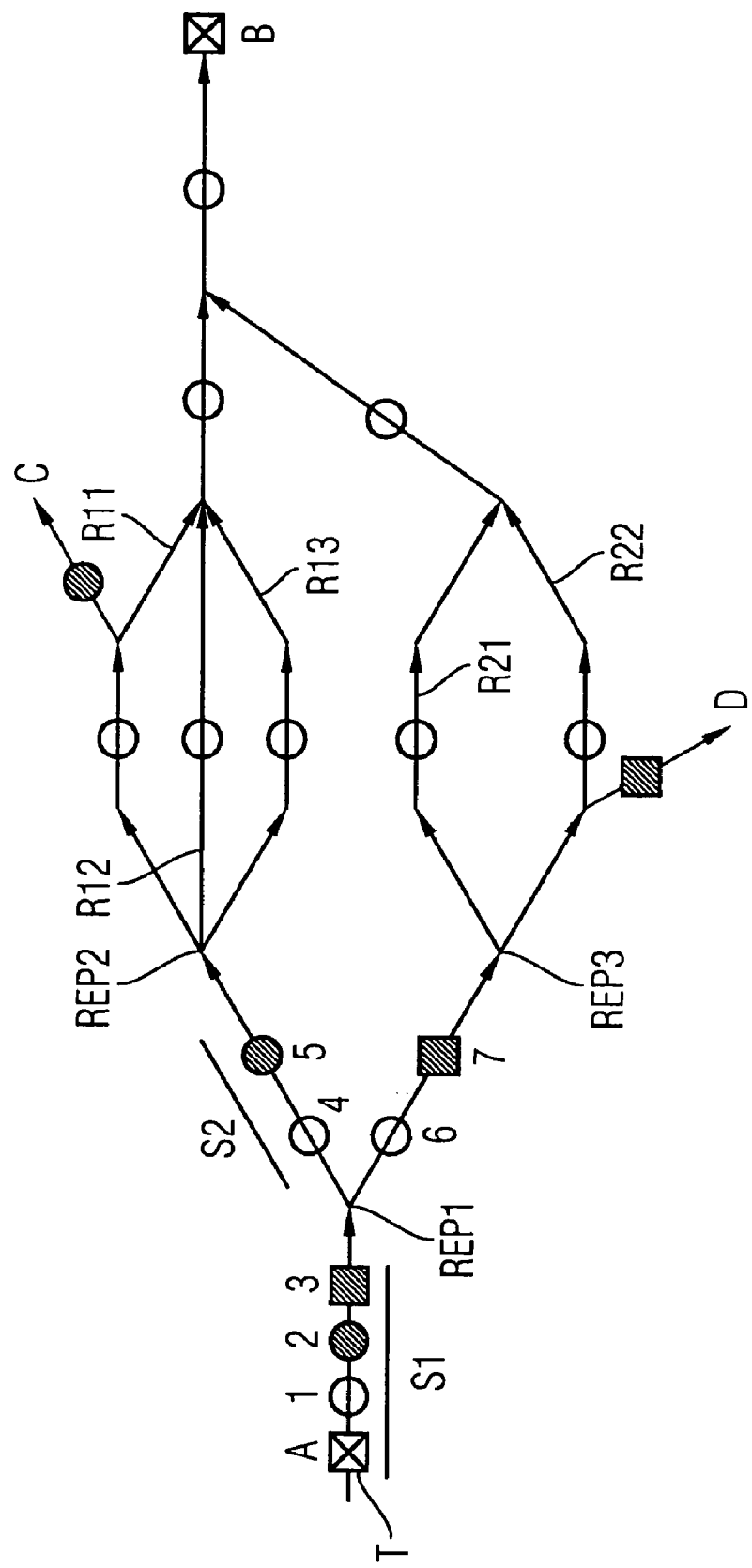

METHOD FOR EQUALIZING TRAFFIC FLOWS AND FOR AVOIDING AND RESOLVING CONGESTION

PRIORITY STATEMENT

This application is the national phase under 35 U.S.C. §371 of PCT International Application No. PCT/EP2006/064008 which has an International filing date of Jul. 7, 2006, which designated the United States of America and which claims priority on German Patent Application DE 10 2005 033 460.1 filed Jul. 18, 2005, the entire contents of which are hereby incorporated herein by reference.

FIELD

At least one embodiment of the invention generally relates to a method for equalizing traffic flows and for avoiding and resolving congestion. For example, it may relate to one wherein, when a plurality of alternatively possible routes to a respective destination are available, traffic participants receive individual route recommendations in a coordinated manner.

BACKGROUND

The result of ever-increasing road traffic is congestion that has enormous negative repercussions. The aim is to avoid congestion or quickly resolve it. For that purpose information about congestion is sent to traffic participants along with recommended diversions. Traffic along the recommended diversion route frequently comes to a standstill as a result.

To eliminate or avoid the problem, an auction-based method for individual route recommendations is known from, for instance, the computer science seminar given at Wedel University on Apr. 8, 2004, by Prof. Dr. Uwe Schmidt and Dr. Sebastian Iwanowski on the subject of "Distributed Systems", with which method usage rights for route segments for specific time intervals are auctioned in the background in periodic auction rounds and the vehicles periodically receive a virtual budget.

SUMMARY

In at least one embodiment, the invention discloses a method for equalizing traffic flows and for avoiding and resolving congestion, wherein as simple and reliable as possible equalizing of the traffic flows and minimizing of travel time will be enabled.

At least one embodiment of the method includes a method by which traffic flows will be equalized through traffic participants' receiving individual route recommendations from a traffic control computer in such a way that the traffic control computer uses both reports from traffic participants and route segment parameters such as, for instance, capacity utilization and mean traveling speed to determine for each route branch point at specific time intervals a new respective distribution ratio for the statistical frequency of the respective route recommendations at a respective route branch point, with a route being assigned a higher frequency in the case of more favorable than poorer traffic conditions, and in such a way that, ahead of a respective route branch point, a respective traffic participant will receive a random route recommendation from the set of alternatively possible routes in accordance with the statistical frequency of the respective route recommendations. The method of at least one embodiment is suitable especially for vehicles having a navigation system.

BRIEF DESCRIPTION OF THE DRAWINGS

The invention is explained in more detail below with reference to an example embodiment shown in the drawing.

DETAILED DESCRIPTION OF THE EXAMPLE EMBODIMENTS

The drawing shows a route network including segments, for example S1 and S2, in the form of a vectorized graph between a current location A of a traffic participant T and his/her destination B, with the graph having generally at route branch points, for example REP1, REP2, and REP3, alternatively selectable route sections as well as transfers to other destinations, for example to C and D.

In the example embodiment, the graph divides at the first route branch point REP1 into a left-hand branch, which is thereafter divided at a second route branch point REP2 into three further branches, and into a right-hand branch, which is thereafter divided at a third route branch point REP3 into two further branches. Thus, via the left-hand branch in the graph there are three possible routes R11, R12, and R13 and via the right-hand branch in the graph there are two possible routes R21 and R22 from the point A to the destination point B. In segment S1 ahead of the first route branch point REP1 there are, alongside the vehicles shown in the form of small circles and heading for the destination B, also vehicles shown as filled circles or squares and heading for, for example, the destinations C and D. On the first segment of the left-hand branch after the first route branch point REP1 there are, for example, only vehicles having the destination B or C, because the vehicles having the destination D can only use the right-hand branch.

All traffic participants T and 1 . . . 7 or a selected representative portion thereof send reports M to at least one traffic control computer, with a report of the type including at least one identifier of the vehicle and its location at a specific instant.

A report of the type advantageously further includes a destination of the vehicle.

The at least one traffic control computer uses both reports M from traffic participants and route segment parameters such as, for instance, capacity utilization and mean traveling speed to determine for each route branch point REP1, REP2, REP3 at specific time intervals a new respective distribution ratio V for the statistical frequency of the respective routes of a respective route branch point, with a route being assigned a higher frequency in the case of more favorable than poorer traffic conditions.

Ahead of a respective route branch point, for example at the current point A, a respective traffic participant T receives a random route recommendation RE from the set of alternatively possible routes in accordance with the statistical frequency of the respective route branches.

Via, for example, induction loops already present in the road or actively via the vehicle itself, the traffic control computer is optionally given feedback indicating on which route segment the vehicle or driver is traveling onward at the route branch point. The distribution of the vehicles that follow will be matched to the individual routes accordingly.

The remaining capacity of the routes changes through the vehicles' being distributed over the different routes. The capacity will also change when closed lanes have been reopened or congestion has resolved itself. The distribution ratio is therefore constantly reviewed and adjusted.

The individual route allocating can be realized in various ways. In the case of vehicles with a built-in navigation system it can be notified directly to the system, which will then guide the driver accordingly.

A first method for producing and transmitting the individual route recommendation consists in conveying the information about the distribution ratio V of the routes to the individual vehicles' navigation systems via radio-based traffic message channels such as TMC (Traffic Message Channel) or its successor systems. If the route section being equalized is relevant to the travel destination B entered by the driver, then, using a random number, the respective navigation system will automatically select one of the alternative routes R11, . . . , R22 and guide the driver accordingly. The selection procedure is designed such that the vehicles will be distributed over the individual routes in the required ratio across the totality of all participating systems.

An advantageous selection procedure is performed as follows, for instance, with the vehicles being distributed over the individual routes in the ratio k1:k2: . . . : :

Select a random number z between 0 and <1.
$k=k_1+k_2+\ldots+k_n$
$S_i=(k_1+k_2+\ldots+k_i)/k$; $S_0=0$
Select route $r_i$ if $S_{i-1} \leqq z < S_i$ Another method for producing and transmitting the individual route recommendation consists in briefly setting up a connection between a system mounted by the road and a vehicle via a wireless communication link, for example Wireless LAN (WLAN) or infrared or microwave. The different route recommendations RE are alternately conveyed in the ratio k1:k2: . . . :kn via the connection to the vehicles driving past.

A final method for producing and transmitting the individual route recommendation consists in transmitting the respective specific route recommendation RE from the control system individually to the individual traffic participants via a wireless communication link, for example a WLAN or a GPRS or UMTS mobile radio link, between the vehicle of the participant T and the traffic control system. All the vehicles receive recommendations for the various routes in the ratio k1:k2: . . . :kn.

The advisory is then forwarded in the vehicle to the navigation system; the driver is informed acoustically via the navigation system's voice output.

Advantageously, the travel destination entered by the driver is optionally additionally conveyed to the server of the traffic control computer via the navigation system's communication interface. The server will take account of the vehicle while an individual route recommendation is being allocated only if traffic equalizing is relevant to the vehicle based on its travel destination. Routes will as a result not be allocated to all vehicles but only to those actually wishing to travel from A to B, which in the final analysis will equalize the traffic even better.

A final embodiment variant of the inventive method enables traffic equalizing using today's already existing infrastructure and is suitable also for vehicles that do not have a navigation system:

Change signs will be set up at traffic junctions at which the traffic may need to be equalized. The signs can direct the path to B via one route or the other. If the traffic is to be equalized, the change sign will alternately indicate the path to B via one route for n seconds, then switch over for m seconds and direct the path via the other route. The times n and m correspond to the ratio in which the traffic is to be distributed between the alternative routes. Drivers who do not wish to adhere to the traffic recommendation and instead select, for example, their wonted path will be registered and will influence the distribution ratio for the vehicles that follow.

While it is possible to realize the individual inventive traffic equalization methods mutually independently, a combination of a plurality of methods is also possible and expedient.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method, comprising:
    sending, when a plurality of alternatively possible routes to a respective destination are available, individual route recommendations to respective traffic participants;
    using, via at least one traffic control computer, both reports from traffic participants and route segment parameters to determine, for each route branch point along said plurality of alternatively possible routes, at specific time intervals a new respective distribution ratio for a statistical frequency of the respective route recommendations at a respective route branch point, with a route being assigned a relatively higher frequency in the case of relatively more favorable traffic conditions; and
    sending, ahead of the respective route branch point, a respective traffic participant a random route recommendation from a set of alternatively possible routes in accordance with the statistical frequency of the respective route recommendations.

2. The method as claimed in claim 1, further comprising:
    receiving, from the traffic participants, travel destinations, at the traffic control computer, in the reports, wherein the traffic control computer takes account of the respective traffic participant while an individual route recommendation is being allocated only if the respective travel destination of the route recommendation matches the traffic participant's respective travel destination.

3. The method as claimed in claim 2, wherein the respective distribution ratio is conveyed to the respective traffic participants via radio-based traffic message channels, and wherein the individual route recommendations are formed with the aid of a vehicle navigation system from the received respective distribution ratio of the routes.

4. The method as claimed in claim 3, wherein, ahead of the respective route branch point, a respective route $r_i$ is selected for the respective traffic participant in accordance with the respective distribution ratio $k_1:k_2: \ldots :k_n$ randomly from n alternatively possible routes in such a way that the route $r_i$ is selected if a respectively generated random number z between 0 and less than 1 lies within the interval $S_{i-1} <= z < S_i$ belonging to the respective route, with the respective interval limits being determined by the relationships $S_0=0$ and $S_i=(k_1+k_2+\ldots+k_i)/(k_1+k_2+\ldots+kn)$.

5. The method as claimed in claim 2, wherein the respective route recommendation is transmitted by briefly setting up a connection between a system mounted by the road and the respective participant's vehicle via a wireless communication link ahead of the respective route branch point.

6. The method as claimed in claim 2, wherein the respective route recommendation is transmitted by setting up an individual wireless communication link between the traffic control computer and the respective traffic participant.

7. The method as claimed in claim 2, wherein the respective route recommendations are effected with the aid of change signs, with the display times of respective change signs being selected in accordance with the distribution ratio.

8. The method as claimed in claim 7, wherein traffic participants not adhering to the route recommendation will be registered and reported to the traffic control computer, wherein they will be taken into account when the distribution ratios at the route branch points along routes traveled by said non-adhering traffic participants are determined.

9. The method as claimed in claim 1,
wherein the new respective distribution ratio is conveyed to the respective traffic participants via radio-based traffic message channels, and
wherein the individual route recommendations are formed with the aid of a vehicle navigation system from the received respective distribution ratio of the routes.

10. The method as claimed in claim 9,
wherein, ahead of the respective route branch point, a respective route $r_i$ is selected for the respective traffic participant in accordance with the respective distribution ratio $k_1:k_2:\ldots:k_n$ randomly from n alternatively possible routes in such a way that the route $r_i$ is selected if a respectively generated random number z between 0 and less than 1 lies within the interval $S_{i-1} <= z < S_i$ belonging to the respective route, with the respective interval limits being determined by the relationships $S_0=0$ and $S_i=(k_1+k_2+\ldots+k_i)/(k_1+k_2+\ldots+kn)$.

11. The method as claimed in claim 1,
wherein the respective route recommendation is transmitted by briefly setting up a connection between a system mounted by the road and the respective participant's vehicle via a wireless communication link ahead of the respective route branch point.

12. The method as claimed in claim 1,
wherein the respective route recommendation is transmitted by setting up an individual wireless communication link between the traffic control computer and the respective traffic participant.

13. The method as claimed in claim 1,
wherein the respective route recommendations are effected with the aid of change signs, with the display times of respective change signs being selected in accordance with the distribution ratio.

14. The method as claimed in claim 13,
wherein traffic participants not adhering to the route recommendation will be registered and reported to the traffic control computer, wherein they will be taken into account when the distribution ratios at the route branch points along routes traveled by said non-adhering traffic participants are determined.

15. A system, comprising:
means for sending, when a plurality of alternatively possible routes to a respective destination are available, individual route recommendations to respective traffic participants;
at least one traffic control computer configured to use both reports from traffic participants and route segment parameters to determine, for each route branch point along said plurality of alternatively possible routes, at specific time intervals a new respective distribution ratio for a statistical frequency of the respective route recommendations at a respective route branch point, with a route being assigned a relatively higher frequency in the case of relatively more favorable traffic conditions; and
wherein the means for sending is further for sending, ahead of the respective route branch point, a respective traffic participant a random route recommendation from a set of alternatively possible routes in accordance with the statistical frequency of the respective route recommendations.

16. The system as claimed in claim 15, further comprising:
means for receiving, from the traffic participants, travel destinations, at the traffic control computer, in the reports, wherein the traffic control computer takes account of the respective traffic participant while an individual route recommendation is being allocated only if the respective travel destination of the route recommendation matches the traffic participant's respective travel destination.

\* \* \* \* \*